United States Patent [19]

Tani et al.

[11] Patent Number: 4,607,264
[45] Date of Patent: Aug. 19, 1986

[54] RECORDING MEDIUM OF DEFORMABLE AIR-SANDWICH STRUCTURE

[75] Inventors: Yoshio Tani, Fujinomiya; Kyoichi Naruo, Hatano, both of Japan

[73] Assignee: Fuji Photo Film Co., Ltd., Japan

[21] Appl. No.: 766,947

[22] Filed: Aug. 19, 1985

[30] Foreign Application Priority Data

Aug. 17, 1984 [JP] Japan .................................. 59-171323

[51] Int. Cl.$^4$ ........................ G01D 15/32; G11B 7/26
[52] U.S. Cl. .................................... 346/137; 369/284; 369/287
[58] Field of Search ................. 346/137; 369/284, 287

[56] References Cited
U.S. PATENT DOCUMENTS 4,449,138  5/1984  Ando ........................... 346/135.1 X Primary Examiner—E. A. Goldberg
Assistant Examiner—Gerald E. Preston
Attorney, Agent, or Firm—Ostrolenk, Faber, Gerb & Soffen

[57] ABSTRACT

A recording medium having an air-sandwich structure comprising two disc-shaped substrates opposed to each other at a given distance by interposing therebetween a ring-shaped inner spacer and a ring-shaped outer spacer and a recording layer for writing and/or reading information with laser beam which is provided on the inner surface of at least one substrate, characterized in that the distance between said two substrates satisfies the following expression (I):

$$h > \frac{0.66 \times 10^{-4}}{E_1}\left(\frac{l^4}{t_1^3}\right) + \frac{0.66 \times 10^{-4}}{E_2}\left(\frac{l^4}{t_2^3}\right) \quad (I)$$

wherein h is the distance in mm between two substrates, $E_1$ and $E_2$ are each a Young's modulus (in kg/mm$^2$) of each substrate, l is the distance (in mm) between the inner spacer and the outer spacer, and $t_1$ and $t_2$ are each the thickness (in mm) of each substrate.

17 Claims, 5 Drawing Figures

RECORDING MEDIUM OF DEFORMABLE AIR-SANDWICH STRUCTURE

BACKGROUND OF THE INVENTION

1. Field of the Invention

The present invention relates to a recording medium having an air-sandwich structure, and more particularly to a recording medium of air-sandwich structure for writing and/or reading information by means of laser beam of high energy density.

2. Description of Prior Arts

Information recording mediums utilizing a beam of high energy density such as laser beam have been developed in recent years and are put to practical use. Such recording medium is called optical disc and the practical applications thereof have been found, for example, as video disc and audio disc as well as disc memory for large-capacity computer and large-capacity static image file.

The optical disc basically comprises a disc-shaped transparent substrate of a plastic or glass material and a recording layer composed of a metal such as Bi, Sn, In or Te or a semi-metal provided on said substrate. Writing of information on the optical disc can be conducted, for example, by irradiating the optical disc with laser beam. Under irradiation with the laser beam, the irradiated area of the recording layer of the optical disc absorbs the energy of beam and a rise in temperature locally occurs and as a result, a chemical or physical change is caused to alter optical characteristics of the recording layer in the irridated area, whereby the recording of information can be made. Reading of information from the optical disc is also conducted by irradiating the optical disc with laser beam. The information can be reproduced by detecting reflected light or transmitted light corresponding to the alternation in the optical characteristics of the recording layer.

As a disc structure for protecting the recording layer, there has been recently proposed an air-sandwich structure in which a recording layer is provided on at least one of two disc-shaped substrates and positioned inside the two substrates opposed to each other at a given distance by interposing a ring-shaped inner spacer and a ring-shaped outer spacer between the substrates so as to form space surrounded by these two substrates and these two spacers. In the optical disc having such a structure, the recording layer is not directly exposed to the outer air and the recording and reproduction of information is conducted with laser beam passing through the substrate. Accordingly, in general there is no possibility that the recording layer is physically or chemically damaged or the surface thereof is covered with dust which is to interfere with the recording and reproduction of information.

It is known that an optical disc of the air-sandwich structure type is transported, used and stored under various environmental conditions. Under the variation of the conditions, there occurs a difference in pressure between the outside of the disc and the inside space thereof filled with an inert gas, etc., via change of temperature or atmospheric pressure dependent on altitude. As a result, the contraction (reduction in the volume) of the internally filling gas or the expansion of said gas occurs to cause deformation of the substrates. The deformation of the substrates is liable to make a failure in the operation of focus servo and further serious deformation may cause the breakage of the substrates. Particularly, the two opposed substrates are easily brought into contact with each other by the concentration (reduction in the volume) of the filling gas under low-temperature or high-pressure environmental conditions. Thus, there is caused a serious problem that the inner recording layer is damaged by the contact between both substrates. The damage of the recording layer seriously interferes with the recording and reproducing of information in a recording medium where the recording is made by changing the optical characteristics of the recording layer through a physical change such as pit formation.

SUMMARY OF THE INVENTION

It is a principal object of the present invention to provide a recording medium of air-sandwich structure which hardly suffers deformation resulting in contact between the two substrates even when it encounters a great change of the environmental conditions.

The present invention provides a recording medium having an air-sandwich structure comprising two disc-shaped substrates opposed to each other at a given distance by interposing therebetween a ring-shaped inner spacer and a ring-shaped outer spacer and a recording layer for writing and/or reading information with laser beam which is provided on the inner surface of at least one substrate, characterized in that the distance between said two substrates satisfies the following expression (I):

$$h > \frac{0.66 \times 10^{-4}}{E_1}\left(\frac{l^4}{t_1^3}\right) + \frac{0.66 \times 10^{-4}}{E_2}\left(\frac{l^4}{t_2^3}\right) \quad \text{(I)}$$

wherein h is the distance in mm between two substrates, $E_1$ and $E_2$ are each a Young's modulus in kg/mm² of each substrate, l is the distance in mm between the inner spacer and the outer spacer, and $t_1$ and $t_2$ are each the thickness in mm of each substrate.

The present invention preferably provides a recording medium in which the distance between said two substrates satisfies the following expression (II):

$$h > \frac{0.96 \times 10^{-4}}{E_1}\left(\frac{l^4}{t_1^3}\right) + \frac{0.96 \times 10^{-4}}{E_2}\left(\frac{l^4}{t_2^3}\right) \quad \text{(II)}$$

wherein h, $E_1$, $E_2$, l, $t_1$ and $t_2$ are the same meanings as defined above.

In the expressions (I) and (II), each of the distance h between the substrates and the distance l between the spacers is represented by a distance in the clear. $E_1$ and $t_1$ are for one substrate, and $E_2$ and $t_2$ are for the other substrate.

DETAILED DESCRIPTION OF THE INVENTION

According to the invention, the dimensions of the inner space of the recording medium of air-sandwich structure is defined to prevent the deformation of the substrates caused by difference in pressure between the inside and the outside of the air-sandwich structure, particularly to prevent the contact between the opposed substrates and the breakage of the substrates, the latter being caused by the deformation of the substrates resulting from the contraction (reduction in the volume) of the filling gas.

The relationship between pressure difference and substrate deformation in the air-sandwich structure optical disc can be experimentally represented by the following equation (IV):

$$\alpha = \frac{4.57 \times 10^{-2} \Delta P \cdot l^4}{E \cdot t^3} \qquad (IV)$$

wherein $\alpha$ is the deformation in mm of the substrate, $\Delta P$ is the difference in pressure in $kg/mm^2$ between the inside and the outside of the air-sandwich structure, E is a Young's modulus in $kg/mm^2$ of the substrate, l is the distance in mm between the inner spacer and the outer spacer, and t is the thickness in mm of the substrate.

In the equation (IV), the deformation $\alpha$ is for one substrate, and Young's modulus E is a constant depending on the material of the substrate to be used.

Figure 3:
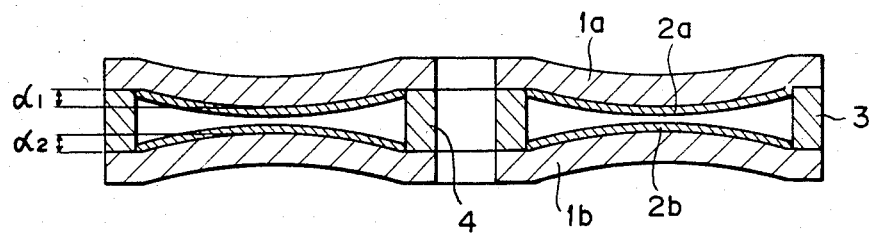
FIG. 3 is a cross-sectional view of a recording medium of air-sandwich structure whose substrates are deformed due to difference in pressure between the inside and the outside of the air-sandwich structure.

The deformation $\alpha$ of the substrate can be estimated from the above equation (IV) on the basis of pressure differences $\Delta P$ under forecasted environmental conditions during the transportation, the use and the storage of the recording medium, if the material and the thickness of each of the two substrates and the distance between the spacers of the air-sandwich structure are fixed. The distance h between the two substrates should be larger than the deformation of both substrates so as not to cause the damage of the inner recording layer and the breakage of the substrates owing to the contact of the substrates. Accordingly, the substrates are opposed to each other preferably at such a distance as to satisfy the following expression:

$$h > \alpha_1 + \alpha_2$$

wherein $\alpha_1$ and $\alpha_2$ are the deformation of each substrate (see, FIG. 3).

It is generally required that the recording medium has a durability under the forecasted environmental conditions such as temperature and altitude given in Table 1, when the recording medium has a glass substrate at a diameter of 300 mm. Pressure differences given in Table 1 are values obtained when the temperature of the filling gas to be introduced in the production of the recording medium is set to $23°$ C.

TABLE 1

| | Temperature (°C.) | Pressure difference ($\times 10^{-2}$ kg/mm$^2$) |
|---|---|---|
| Use conditions | 10 to 45 | −0.04 to 0.07 |
| Storage conditions | 10 to 45 | −0.04 to 0.07 |
| Transport conditions | −40 to 60 | −0.21 to 0.13 |
| | Altitude (m) | Pressure difference ($\times 10^{-2}$ kg/mm$^2$) |
| Use conditions | 2000 or lower | up to 0.215 |
| Storage conditions | −300 to 3700 | −0.04 to 0.37 |
| Transport conditions | −300 to 3700 | −0.04 to 0.37 |

From Table 1, the pressure difference $\Delta P$ which causes the contraction of the filling gas is $-0.21 \times 10^{-2}$ kg/mm$^2$ at a maximum level. The maximum deformation of the substrates caused by the contraction of the filling gas can be calculated by substituting this value for the equation (IV). Although the maximum pressure difference caused by the expansion of the filling gas is as high as $0.37 \times 10^{-2}$ kg/mm$^2$, there is no possibility that the substrates are brought into contact with each other since the substrates are expanded outwardly.

Alternatively, it is required that the recording medium has a durability under the forecasted environmental conditions such as temperature and altitude given in Table 2, when the recording medium has a plstic substrate at a diameter of 130 mm. Pressure differences given in Table 2 are values obtained when the temperature of the filling gas to be introduced in the production of the recording medium is set at $23°$ C.

TABLE 2

| | Temperature (°C.) | Pressure difference ($\times 10^{-2}$ kg/mm$^2$) |
|---|---|---|
| Use conditions | 10 to 45 | −0.04 to 0.07 |
| Storage conditions | 10 to 45 | −0.04 to 0.07 |
| Transport conditions | −20 to 60 | −0.145 to 0.13 |
| | Altitude (m) | Pressure difference ($\times 10^{-2}$ kg/mm$^2$) |
| Use conditions | 2000 or lower | up to 0.215 |
| Storage conditions | −300 to 3700 | −0.04 to 0.37 |
| Transport conditions | −300 to 3700 | −0.04 to 0.37 |

From Table 2, the pressure difference $\Delta P$ which causes the contraction of the filling gas is $-0.145 \times 10^{-2}$ kg/mm$^2$ at a maximum level. The maximum deformation of the substrates caused by the contraction of the filling gas can be calculated by substituting this value for the equation (IV).

The substrates can be prevented from contact with each other caused by the contraction of the filling gas, if the distance between the two substrates is rendered greater than the maximum deformation at a temperature of $-20°$ C. (more preferably, than that at a temperature of $-40°$ C.). Namely, when the distance h between the substrates satisfies the aforementioned expression (I) for given values for the distance l between the spacers and the thickness $t_1$ and $t_2$ of the substrates, the substrates are kept from being deformed to contact each other and hence, failure in the operation of the focus servo is avoided, and further damage of the recording layer and breakage of the substrates caused by the contact of the substrates are effectively prevented. Particularly when the distance h satisfies the expression (II), the substrates are preferably kept from contacting with each other, and the damage of the recording medium and the breakage of the substrates are more effectively prevented.

The recording medium provided with the above-stated characteristics according to the present invention can be prepared, for example, in the following manner.

The substrate material employed in the invention can be selected from any materials which have been employed as the substrates of conventional recording mediums. From the viewpoint of optical characteristics, smoothness, workability, handling properties, long-term stability and manufacturing cost, preferable examples of the substrate material include glass such as tepered glass, acrylic resins such as cell-cast polymethyl methacrylate and injection-molded polymethyl methacrylate; vinyl chloride resins such as polyvinyl chloride and vinyl chloride copolymer; polycarbonate resins; and epoxy resins. Among these materials, glass (Young's modulus: 7200 kg/mm$^2$), acrylic resins (Young's modulus: 250 to 350 kg/mm$^2$) and polycarbonates (Young's modulus: 220 to 250 kg/mm$^2$) are preferred. Particularly preferred is tempered glass because of its high Young's modulus and non-easiness of deformation, and are injection-molded polymethyl methacrylate and polycarbonate because of their lower manufacturing cost and good handling properties.

The thickness of the substrate is preferably 2.0 mm or below from the viewpoint of optical characteristics, and a thickness ranging from 1.0 to 2.0 mm is particularly preferred. Further, it is desirable that the two substrates has the same thickness and are made of the same material from the viewpoint of the mechanical strength of the recording medium.

The surface of the substrate on which a recording layer is provided may be provided with an undercoating layer for the purpose of improving smoothness, adhesion to the recording layer and sensitivity by heat insulating and preventing the recording layer from being denatured. Examples of material for such undercoating layer include polymer materials such as polymethyl methacrylate, acrylic acid-methacrylic acid copolymer, polyesters, polyimides, vinyl acetate-vinyl chloride copolymer, ethylenevinyl acetate copolymer, polyethylene, polypropylene and polycarbonate.

The undercoating layer can be formed on the substrate, for example, by the following procedure. First, a coating solution (or dispersion) is prepared by dissolving or dispersing the polymer material in an appropriate solvent. The coating solution (or dispersion) is then applied to the surface of the substrate by a conventional coating process such as spin coating, dip coating, extrusion coating, bar coating or screen printing. The thickness of the undercoating layer is generally in the range of 0.01 to 20 μm, preferably 0.1 to 10 μm and more preferably 0.02 to 1 μm.

The recording layer is then formed on the substrate. Examples of material employed for the recording layer include metals such as Te, Zn, In, Sn, Zr, Al, Cu and Ga; semi-metals such as Bi, As and Sb; semiconductors such as Ge and Si; and alloys thereof and combinations thereof. Further, sulfides, oxides, borides, silicides, carbides and nitrides of these metals and these semi-metals and mixtures of these compounds and the above-stated metals can also be employed for the material of the recording layer.

The recording layer can be formed directly on the substrate or on the undercoating layer by means of metallizing, sputtering or ion plating process. The recording layer may be composed of a single layer or plural layers. However, the thickness of the recording layer is generally in the range of 100 to 5,500 Å from the viewpoint of optical density required for the optical recording.

When the recording medium is dedicated to reproduction only, a fine pattern of recess and protrusion is previously formed on one side of the substrate by means of a stamper and a layer of a reflecting material such as Al or Cu may be then formed thereon.

After the formation of the recording layer on the substrates, two substrates are bonded to each other with an adhesive agent by interposing spacers therebetween in such a manner that the recording layer is positioned inside the substrates. The recording layer may be provided on only one of the two substrates or on each of both substrates. The spacers may be bonded directly to the surface of the undercoating layer.

A thin film of an inorganic material such as silicon dioxide, tin oxide or manganese fluoride may be formed on the free surface of the substrate (the surface not facing the recording layer) by means of vacuum metallizing or sputtering process in order to increase resistance to damage and moisture proofness.

Figure 1:
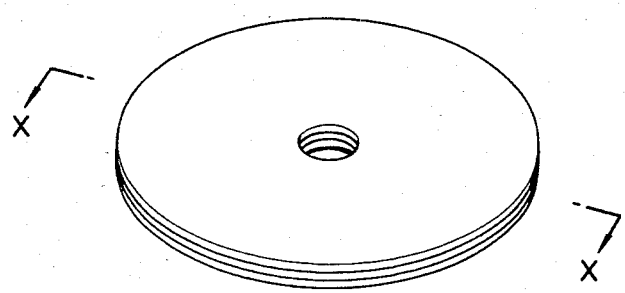
FIG. 1 is a perspective view of a recording medium of air-sandwich structure according to the present invention.
Figure 2:
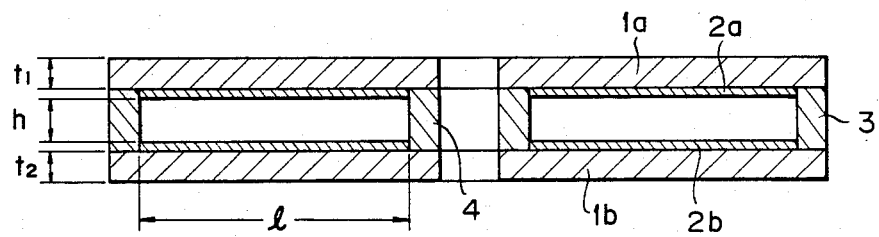
FIG. 2 is a cross-sectional view of the recording medium of air-sandwich structure taken along the line X—X in FIG. 1.

Thus produced recording medium of air-sandwich structure has an appearance shown in FIG. 1, and has such a condition as shown in FIG. 2 wherein each of the recording layers $2a$ and $2b$ is provided on each of two disc-shaped substrates $1a$ and $1b$ and both substrates are bonded to each other via a ring-shaped outer spacer 3 and a ring-shaped inner spacer 4.

FIG. 3 shows an example of the recording medium in which the substrates are deformed due to the difference in pressure between the inside and the outside of the air-sandwich structure.

The internal dimensions of the air-sandwich structure, which is an essential of the present invention, must be such that the distance h between two substrates is larger than the maximum deformation $\alpha_1 + \alpha_2$ to prevent the substrates from contact with each other under such environmental conditions that the durability of the recording medium is required. Namely, the distance h must satisfy the following expression (or condition) (I):

$$h > \alpha_1 + \alpha_2 = \frac{0.66 \times 10^{-4}}{E_1}\left(\frac{l^4}{t_1^3}\right) + \frac{0.66 \times 10^{-4}}{E_2}\left(\frac{l^4}{t_2^3}\right) \quad (I)$$

wherein h is the distance in mm between two substrates, $E_1$ and $E_2$ are each a Young's modulus (kg/mm$^2$) of each substrate, l is the distance in mm between the inner spacer and the outer spacer, and $t_1$ and $t_2$ are each the thickness in mm of each substrate.

Thus, the distance h between the substrates, the distance l between the spacers and the thickness $t_1$ and $t_2$ of the substrates must have the relationship satisfying the expression (I).

More in detail, when the recording medium is kept under the severe environmental conditions at a temperature of lower than $-20°$ C. (namely, $-40°$ C. to $-20°$ C.), the distance h between the substrates preferably satisfies the following expression (II):

$$h > \frac{0.96 \times 10^{-4}}{E_1}\left(\frac{l^4}{t_1^3}\right) + \frac{0.96 \times 10^{-4}}{E_2}\left(\frac{l^4}{t_2^3}\right) \quad \text{(II)}$$

wherein h, $E_1$, $E_2$, l, $t_1$ and $t_2$ are the same meanings as defined above.

Particularly when the two substrates are composed on the same material and has the same thickness, there can be formulated as $E_1 = E_2 = E$ and $t_1 \leq t_2 = t$ and hence, the expression (II) can be represented by the following expression (II'). In this case, the term "same thickness" is used to mean that fluctuation witin ±0.05 mm is considered to be substantially the same.

$$h > 2\alpha = \frac{1.92 \times 10^{-4}}{E}\left(\frac{l^4}{t^3}\right) \quad \text{(II')}$$

wherein h is the distance in mm between two substrates, E is a constant (kg/mm²) representing Young's modulus of the substrate, l is a distance in mm between the inner spacer and the outer spacer, and t is the thickness in mm of the substrate.

Figure 4:
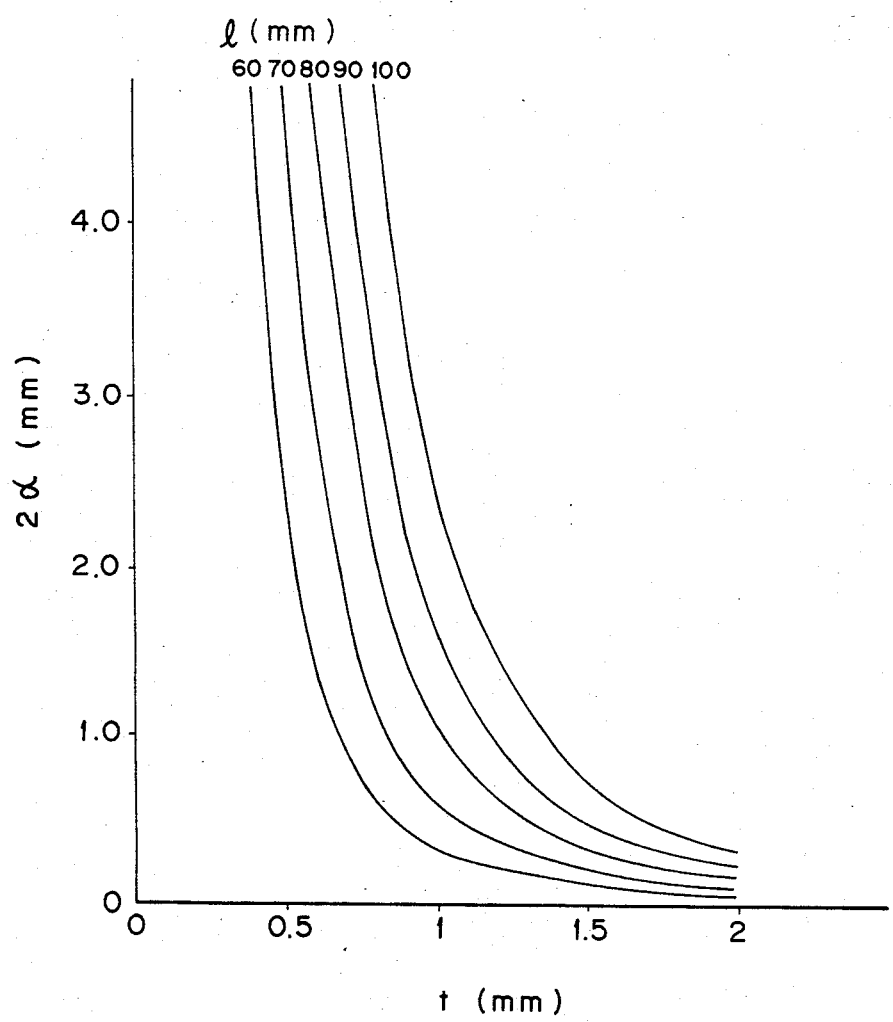
FIG. 4 is a graph showing the relationship among the maximum deformation $2\alpha$ at $-40°$ C., the distance l between the spacers and the thickness t of the substrate with respect to a recording medium using a tempered glass substrate.

For example, when both substrates are made of tempered glass, Young's modulus E is 7200 kg/mm², and the relationship among the maximum deformation 2α (the deformation at pressure difference of $-0.21 \times 10^{-2}$ kg/mm²) of the substrates, the distance l between the spacers and the thickness t of the substrate is shown by a graph of FIG. 4. The value for the distance h between the substrates must always lay in an upper region of each curve for a given distance l in FIG. 4.

Further, the thickness t of the substrate should be 2.0 mm or below, preferably in the range of 1.0 to 2.0 mm from the viewpoint of optical characteristics as described above.

The distance l between the spacers is preferably in the range of 50 to 100 mm from the viewpoint of the capacity for recording information. The distance h between the substrates is preferably in the range of 0.5 to 2.0 mm from the viewpoint of various characteristics of a recording medium.

The internal dimensions of an embodiment of the recording medium having an air-sandwich structure according to the present invention are shown in Table 3. For the purpose of comparison, the internal dimensions of conventional recording mediums are also shown in Table 3. However, these examples are intended merely to illustrate the present invention and it is not intended that the present invention is limited thereby. In Table 3, the values for the maximum deformation 2α are those calculated from the right side member of the above expression (II').

TABLE 3

| | E(kg/mm²) | l(mm) | t(mm) | 2α(mm) | h(mm) |
|---|---|---|---|---|---|
| Example 1 | 7,200 (glass) | 67.5 | 1.3 | 0.25 | 1.0 |
| Comparison Example 1 | 7,200 (glass) | 95.0 | 1.1 | 1.63 | 0.6 |
| Comparison Example 2 | 7,200 (glass) | 95.0 | 1.3 | 0.99 | 0.6 |
| Comparison Example 3 | 340 (acrylic resin) | 85.0 | 1.5 | 8.7 | 1.0 |

It is evident from Table 3 that in the recording medium (Example 1) according to the present invention two substrates are not brought into contact with each other even under the severe environmental conditions (transport conditions at −40° C.) requiring durability, since the distance h between the substrates is larger than the deformation 2α. Further, the recording medium of the invention is advantageous for focus servo even under the use conditions shown in Table 1, and is satisfactorily enabled for writing and reading information under such conditions.

On the other hand, it is possible for the conventional recording mediums (Com. Examples 1 to 3) that the substrates are brought into contact with each other under certain conditions and the contact gives damage to recording medium, because the distance between the substrates are smaller than deformation of the substrates.

When the recording medium is kept under the milder environmental conditions at a temperature of not lower than −20° C., the distance h between the substrates thereof may be such one as to satisfy the following expression (III):

$$\frac{0.96 \times 10^{-4}}{E_1}\left(\frac{l^4}{t_1^3}\right) + \frac{0.96 \times 10^{-4}}{E_2}\left(\frac{l^4}{t_2^3}\right) \geq h > \quad \text{(III)}$$

$$\frac{0.66 \times 10^{-4}}{E_1}\left(\frac{l^4}{t_1^3}\right) + \frac{0.66 \times 10^{-4}}{E_2}\left(\frac{l^4}{t_2^3}\right)$$

wherein h, $E_1$, $E_2$, l, $t_1$ and $t_2$ are the same meanings as defined above.

Particularly when the two substrates are made of the same material and has the same thickness, the expression (III) can be represented by the following expression (III') in the same manner as aforedescribed:

$$\frac{1.92 \times 10^{-4}}{E}\left(\frac{l^4}{t^3}\right) \geq h > \frac{1.32 \times 10^{-4}}{E}\left(\frac{l^4}{t^3}\right) \quad \text{(III')}$$

wherein h, E, l and t are the same meanings as defined above.

Figure 5:
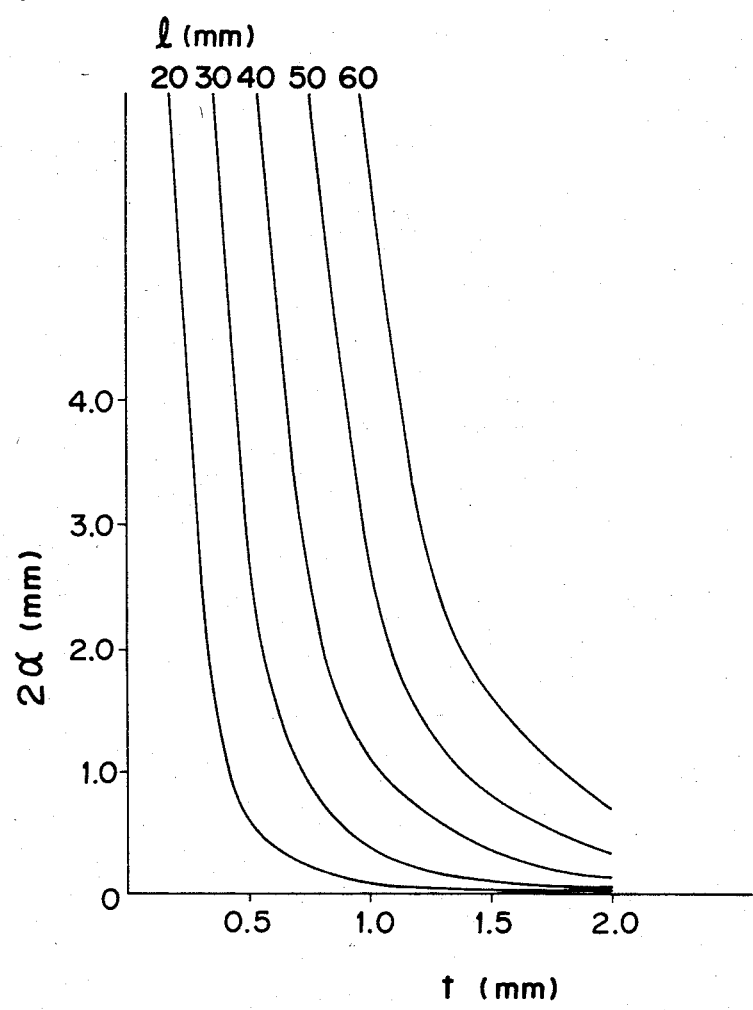
FIG. 5 is a graph showing the relationship among the maximum deformation $2\alpha$ at $-20°$ C., the distance l between the spacers and the thickness t of the substrate with respect to a recording medium using a acrylic resin substrate.

For example, when both substrates are made of an acrylic resin, Young's modulus E is 300 kg/mm², and the relationship among the maximum deformation 2α (the deformation at pressure difference of $-0.145 \times 10^{-2}$ kg/mm²) of the substrates, the distance l between the spacers and the thickness t of the substrate is shown by a graph of FIG. 5. The value for the distance h between the substrates must always lay in an upper region of each curve for a given distance l in FIG. 5.

Further, the thickness t of the substrate should be 2.0 mm or below, preferably in the range of 1.0 to 2.0 mm from the viewpoint of optical characteristics as described above.

The distance l between the spacers is preferably in the range of 25 to 100 mm from the viewpoint of the capacity for recording information. The distance h between the substrates is preferably in the range of 0.2 to 2.0 mm from the viewpoint of various characteristics of a recording medium.

The internal dimensions of another embodiment of the recording medium having an air-sandwich structure according to the present invention are shown in Table 4. For the purpose of comparison, the internal dimensions of conventional recording mediums are also shown in Table 4. However, these examples are intended merely to illustrate the present invention and it is not intended that the present invention is limited thereby. In Table 4, the values for the maximum deformation 2α are those calculated from the right side member of the above expression (III').

TABLE 4

|  | E(kg/mm²) | l(mm) | t(mm) | 2α(mm) | h(mm) |
|---|---|---|---|---|---|
| Example 2 | 300 (acrylic resin) | 35.0 | 1.2 | 0.38 | 0.5 |
| Comparison Example 4 | 7,200 (glass) | 95.0 | 1.1 | 1.13 | 0.6 |
| Comparison Example 5 | 7,200 (glass) | 95.0 | 1.3 | 0.68 | 0.6 |
| Comparison Example 6 | 300 (acrylic resin) | 85.0 | 1.5 | 6.9 | 1.0 |

It is evident from Table 4 that in the recording medium (Example 2) according to the present invention two substrates are not brought into contact with each other even under the environmental conditions (transport conditions at −20° C.) requiring durability, since the distance h between the substrates is larger than the deformation 2α. Further, the recording medium of the invention is advantageous for focus servo even under the use conditions shown in Table 2, and is satisfactorily enabled for writing and reading information under such conditions.

On the other hand, it is possible for the conventional recording mediums (Com. Examples 4 to 6) that the substrates are brought into contact with each other under certain conditions and the contact gives damage to recording medium, because the distance between the substrates are smaller than deformation of the substrates.

We claim:

1. A recording medium having an air-sandwich structure comprising two disc-shaped substrates opposed to each other at a given distance by interposing therebetween a ring-shaped inner spacer and a ring-shaped outer spacer and a recording layer for writing and/or reading information with laser beam which is provided on the inner surface of at least one substrate, characterized in that the distance between said two substrates satisfies the following expression (I):

$$h > \frac{0.66 \times 10^{-4}}{E_1}\left(\frac{l^4}{t_1^3}\right) + \frac{0.66 \times 10^{-4}}{E_2}\left(\frac{l^4}{t_2^3}\right) \quad (I)$$

wherein h is the distance in mm between two substrates, $E_1$ and $E_2$ are each a Young's modulus in kg/mm² of each substrate, l is the distance in mm between the inner spacer and the outer spacer, and $t_1$ and $t_2$ are each the thickness in mm of each substrate.

2. The recording medium as claimed in claim 1, wherein said distance h between the substrates satisfies the following expression (II):

$$h > \frac{0.96 \times 10^{-4}}{E_1}\left(\frac{l^4}{t_1^3}\right) + \frac{0.96 \times 10^{-4}}{E_2}\left(\frac{l^4}{t_2^3}\right) \quad (II)$$

wherein h is the distance in mm between two substrates, $E_1$ and $E_2$ are each a Young's modulus in kg/mm² of each substrate, l is the distance in mm between the inner spacer and the outer spacer, and $t_1$ and $t_2$ are each the thickness in mm of each substrate.

3. The recording medium as claimed in claim 2, wherein said two substrates are made of the same material and has the same thickness, and said distance h between the substrates satisfies the following expression (II'):

$$h > \frac{1.92 \times 10^{-4}}{E}\left(\frac{l^4}{t^3}\right) \quad (II')$$

wherein h is the distance in mm between two substrates, E is a Young's modulus in kg/mm² of the substrate, l is the distance in mm between the inner spacer and the outer spacer and t is the thickness in mm of the substrate.

4. The recording medium as claimed in claim 2 or 3, wherein said distance h between the substrates satisfies the condition of $0.5 \leq h \leq 2.0$ mm.

5. The recording medium as claimed in claim 2, wherein said thickness $t_1$ and $t_2$ of the substrates satisfy the conditions of $1.0 \leq t_1 \leq 2.0$ mm and $1.0 \leq t_2 \leq 2.0$ mm.

6. The recording medium as claimed in claim 3, wherein said thickness t of the substrate satisfies the condition of $1.0 \leq t \leq 2.0$ mm.

7. The recording medium as claimed in claim 2 or 3, wherein said distance l between the inner spacer and the outer spacer satisfies the condition of $50 \leq l \leq 100$ mm.

8. The recording medium as claimed in claim 2 or 3, wherein each of said two substrates is made of a material selected from the group consisting of glass, an acrylic resin and a polycarbonate resin.

9. The recording medium as claimed in claim 8, wherein both of said two substrates are made of tempered glass.

10. The recording medium as claimed in claim 1, wherein said distance h between the substrates satisfies the following expression (III):

$$\frac{0.96 \times 10^{-4}}{E_1}\left(\frac{l^4}{t_1^3}\right) + \frac{0.96 \times 10^{-4}}{E_2}\left(\frac{l^4}{t_2^3}\right) \geq h > \frac{0.66 \times 10^{-4}}{E_1}\left(\frac{l^4}{t_1^3}\right) + \frac{0.66 \times 10^{-4}}{E_2}\left(\frac{l^4}{t_2^3}\right) \quad (III)$$

wherein h is the distance in mm between two substrates, $E_1$ and $E_2$ are each a Young's modulus in kg/mm² of each substrate, l is the distance in mm between the inner spacer and the outer spacer, and $t_1$ and $t_2$ are each the thickness in mm of each substrate.

11. The recording medium as claimed in claim 10, wherein said two substrates are made of the same material and has the same thickness, and said distance h between the substrates satisfies the following expression (III'):

$$\frac{1.92 \times 10^{-4}}{E}\left(\frac{l^4}{t^3}\right) \geq h > \frac{1.32 \times 10^{-4}}{E}\left(\frac{l^4}{t^3}\right) \quad (III')$$

wherein h is the distance in mm between two substrates, E is a Young's modulus in kg/mm$^2$ of the substrate, l is the distance in mm between the inner spacer and the outer spacer and t is the thickness in mm of the substrate.

12. The recording medium as claimed in claim 10 or 11, wherein said distance h between the substrates satisfies the condition of $0.2 \leq h \leq 2.0$ mm.

13. The recording medium as claimed in claim 10, wherein said thickness $t_1$ and $t_2$ of the substrates satisfy the conditions of $1.0 \leq t_1 \leq 2.0$ mm and $1.0 \leq t_2 \leq 2.0$ mm.

14. The recording medium as claimed in claim 11, wherein said thickness t of the substrate satisfies the condition of $1.0 \leq t \leq 2.0$ mm.

15. The recording medium as claimed in claim 10 or 11, wherein said distance l between the inner spacer and the outer spacer satisfies the condition of $20 \leq l \leq 100$ mm.

16. The recording medium as claimed in claim 10 or 11, wherein each of said two substrates is made of a material selected from the group consisting of glass, an acrylic resin, a polycarbonate resin and an epoxy resin.

17. The recording medium as claimed in claim 16, wherein both of said two substrates are made of an acrylic resin or a polycarbonate resin.

* * * * *